(12) United States Patent
Yamada

(10) Patent No.: US 7,808,662 B2
(45) Date of Patent: Oct. 5, 2010

(54) REMOVING PRINT JOB FROM PRINTING QUEUE FOR IMAGE-FORMING DEVICE AND TEMPORARILY HOLDING PRINT JOB

(75) Inventor: Akihiro Yamada, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 967 days.

(21) Appl. No.: 11/535,168

(22) Filed: Sep. 26, 2006

(65) Prior Publication Data

US 2007/0070386 A1 Mar. 29, 2007

(30) Foreign Application Priority Data

Sep. 26, 2005 (JP) ............... 2005-278075

(51) Int. Cl.
*G06K 15/00* (2006.01)
*H04N 1/40* (2006.01)

(52) U.S. Cl. .................... 358/1.14; 358/1.16

(58) Field of Classification Search ............... 358/1.1, 358/1.9, 1.13, 1.14, 1.15, 1.18, 474, 468, 358/1.16
See application file for complete search history.

(56) References Cited

U.S. PATENT DOCUMENTS 5,625,727 A * 4/1997 Liedenbaum et al. ......... 385/16
5,625,757 A 4/1997 Kageyama et al.
6,213,652 B1 * 4/2001 Suzuki et al. ............... 358/1.15
7,630,092 B1 * 12/2009 Suzuki et al. ............... 358/1.14

FOREIGN PATENT DOCUMENTS

| JP | 7-230372 A | 8/1995 |
| JP | 2001-022224 A | 1/2001 |
| JP | 2002-007079 A | 1/2001 |
| JP | 2001-159964 A | 6/2001 |
| JP | 2001-341382 A | 12/2001 |
| JP | 2002-044315 A | 2/2002 |
| JP | 2004-086766 A | 3/2004 |
| JP | 2005-110312 A | 4/2005 |
| JP | 2005-190348 A | 7/2005 |
| JP | 2005-245000 A | 9/2005 |

OTHER PUBLICATIONS

JP Office Action dtd Dec. 9, 2008, JP App. 2005-278075.
JP Office Action dtd Jun. 23, 2009, JP Appln. 2005-278075.
JP Pretrial Reexamination Report dtd May 18, 2010, JP Appeal 2010-000399, JP Appl. 2005-278075, English translation.

* cited by examiner

*Primary Examiner*—Gabriel I Garcia
(74) *Attorney, Agent, or Firm*—Banner & Witcoff, Ltd.

(57) ABSTRACT

An image-forming device includes a printing element for successively printing jobs in a printing queue, a holding element for removing at least one printing job from the printing queue and holding the at least one printing job, and a holding release element for returning the at least one printing job on hold to the printing queue.

14 Claims, 7 Drawing Sheets

REMOVING PRINT JOB FROM PRINTING QUEUE FOR IMAGE-FORMING DEVICE AND TEMPORARILY HOLDING PRINT JOB

CROSS REFERENCE TO RELATED APPLICATIONS

This application claims priority from Japanese Patent Application Nos. 2005-278075 filed Sep. 26, 2005, the entire contents of which are incorporated herein by reference.

FIELD

Aspects of the present invention relate to an image-forming device.

BACKGROUND

Conventional image-forming devices configured to perform printing in the registered job order by storing printing jobs in a storage means have been provided. Among which, in Japanese Unexamined Patent Application Publication No. 2001-341382, a configuration is equipped with a function to cancel a received printing job before or during the printing, such that the registered printing jobs may be stopped while printing, for example, when a defect is found in the printed result.

SUMMARY

However, the art described above only provided the choice of canceling the printing job, even if the intention was to temporarily suspend printing, thus lacking in convenience. For example, during printing, if urgent business were to arise, or the like, and the printing job had to be temporarily removed from the printing queue, or if a situation arose where the printing would have to be performed at a later time, the only way of dealing with this situation was to cancel the printing job; therefore, in such a case, the user had to go through the printing instructions for the printing job again after the cancellation, taking much time and effort.

The present invention was conducted in response to the situation described above, the purpose of which is to provide an image-forming device capable of holding printing jobs once lined up in a printing queue, without canceling said printing jobs.

DETAILED DESCRIPTION

Below, aspects of the present invention are explained with reference to the drawings.

Example 1

Figure 1:
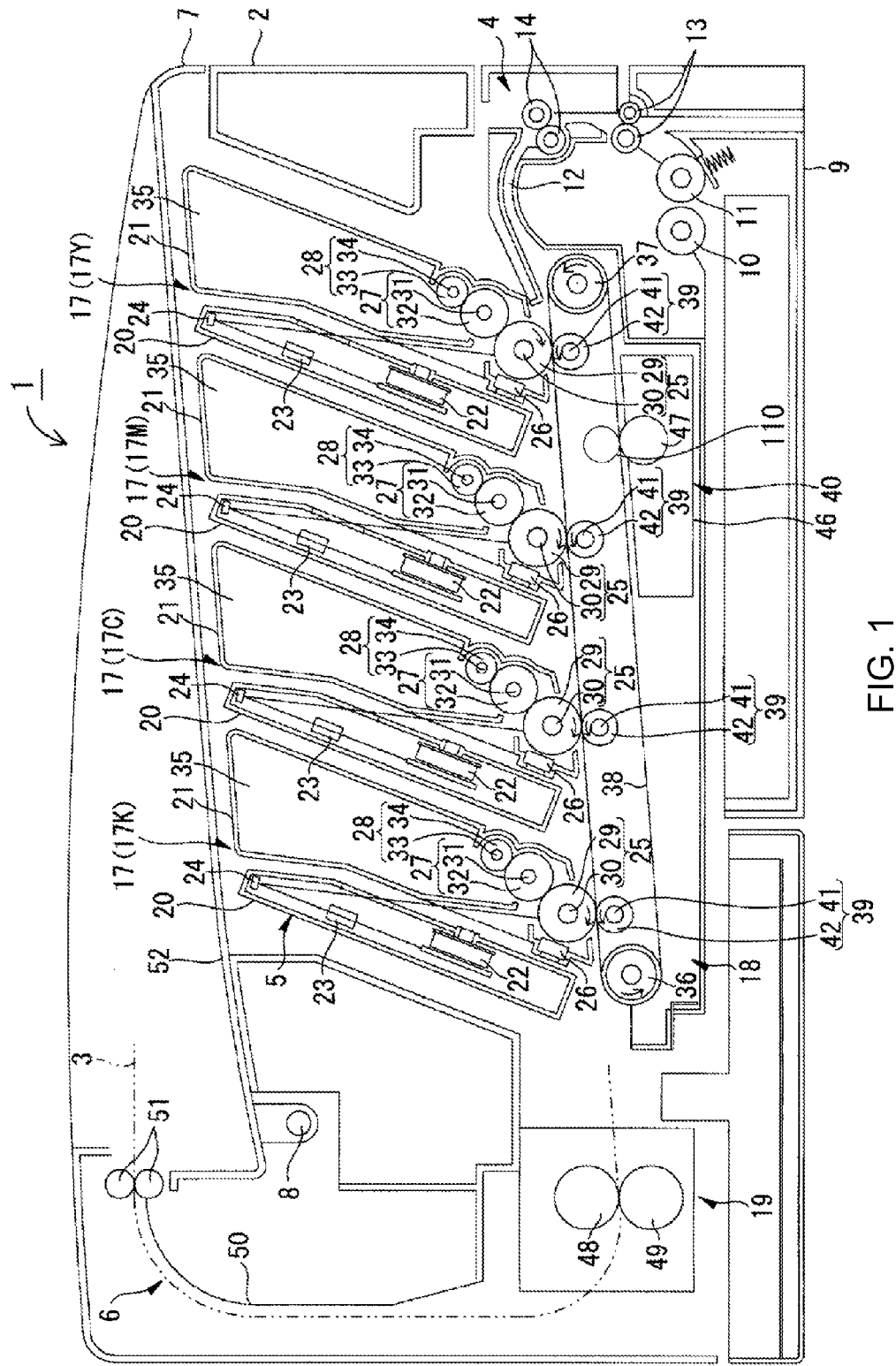
FIG. 1 is a cross-section of a side of a color laser printer serving as an illustrative image-forming device according to aspects of the present invention.

FIG. 1 is a cross-section of a side of a color laser printer serving as an illustrative image-forming device according to aspects of the present invention.

A color laser printer 1 (from hereon, referred to as a laser printer 1) with a longitudinally disposed tandem system includes processing parts 17 arranged horizontally in parallel. The processing parts 17 include in a main casing 2; a paper-feeding part 4 for feeding a paper 3 serving as an illustrative recording medium, an image-forming part 5 for forming an image on the paper 3 fed into the printer, and a paper ejection part 6 for ejecting the paper 3 on which an image has been formed.

The main casing 2 is a substantially rectangular box shape when viewed from the side, and has an upper side that can be opened and has a top cover 7. The top cover 7 is rotatably supported by a cover shaft 8 installed on the rear side of the main casing 2 (in the following description, the left-hand side of FIG. 1 is referred to as the rear side, and the right-hand side is referred to as the front side), which allows the top cover 7 to be freely opened/closed.

The paper-feeding part 4 includes a paper tray 9 provided at the bottom of the main casing 2, a pick-up roller 10 and a paper-feeding roller 11 provided on the upper front side of the paper tray 9, a U-shaped path 12 on the paper-feeding side provided on the upper front side of the paper-feeding roller 11, and a pair of transport rollers 13 and a pair of registration rollers 14 provided along the U-shaped path 12 on the paper-feeding side.

The paper tray 9 is configured to be pulled out. Papers 3 are stacked in the paper tray 9 with the paper on the top of the stack being picked up by the pick-up roller 10 and transported into the U-shaped path 12 on the paper-feeding side by the paper-feeding roller 11.

The U-shaped path 12 on the paper-feeding side is a transport route for the paper 3 with an upstream end abutting the paper-feeding roller 11 such that the paper 3 is fed toward the front and a downstream end abutting a transport belt 38, which will be described later, such that the paper 3 is passed to the rear.

Then, the paper 3 fed toward the front into the upstream end of the U-shaped path 12 on the paper-feeding side is transported by the transport rollers 13 on the paper-feeding side, then the transport direction is reversed by the registration rollers 14 and the paper 3 is passed toward the rear.

The image-forming part 5 includes a processing part 17, a transfer part 18, and a fixing part 19. The processing part 17 is provided for each toner color to make multiple colors. That is, the processing part 17 is composed of four parts: a yellow processing part 17Y, a magenta processing part 17M, a cyan processing part 17C, and a black processing part 17K. These processing parts 17 are successively arranged in parallel so as to be spaced apart front to back and to overlap horizontally.

Each processing part 17 includes a scanner unit 20 serving as an exposure device securely arranged and a freely attachable/detachable processing cartridge 21 mounted on each processing part 17. The scanner unit 20 includes a laser beam emitting part (not illustrated), a polygon mirror 22, a lens 23, and a reflection mirror 24. In the scanner unit 20, a laser beam created from image data emitted from the laser beam emitting part is reflected at the polygon mirror 22, passed though the lens 23, reflected by the reflection mirror 24, and emitted onto the photoreceptor drum 25, which will be described later.

Each processing cartridge 21 is configured to be attachable/detachable in an inclined direction with respect to the front/rear direction and in the upward/downward direction, that is, in the direction such that the upper part inclines to the front side. Each processing cartridge 21 includes a photoreceptor drum 25, a scorotron charger 26, a developing roller 27, and a supply roller 28.

The photoreceptor drum 25 is cylindrically shaped and includes a drum 29 formed by a positively charged photosensitive layer having a top surface layer composed of a polycarbonate etc., and a drum shaft 30 extending along the axial direction of the drum 29 in the center axis of the drum 29. The drum 29 is rotatably provided with respect to the drum shaft 30. The drum shaft 30 is supported in a non-rotatable manner by both walls in the width direction (the direction perpendicular to the front/rear direction and the upward/downward direction, from hereon, widthwise) of the frame of the processing cartridge 21. When an image is being formed, the photoreceptor drum 25 is driven to rotate in the same direction (clockwise direction in the figure) as the direction of travel of a transport belt 38 at the point of contact (image-forming position) with the transport belt 38, which will be described later.

The scorotron charger 26 is positively charged and generates corona discharge including wires and grids. The scorotron charger 26 is disposed at the rear of and opposite to the photoreceptor drum 25 leaving a space therebetween so as not to be in contact. The developing roller 27 is disposed above and opposite to the photoreceptor drum 25. Also, the developing roller 27 is positioned so as to be in contact with the photoreceptor drum 25. The developing roller 27 includes a roller shaft 31 made of metal that is covered by a roller portion 32 made of a resilient material, such as a conductive rubber material, etc.

The supply roller 28 is disposed above and opposite to the developing roller 27. Also, the supply roller 28 is positioned so as to be in contact with the developing roller 27. The supply roller 28 includes a roller shaft 33 made of metal that is covered by a roller portion 34 made of a conductive sponge material. Furthermore, the roller shaft 33 is rotatably supported widthwise by both walls of the processing cartridge 21.

Furthermore, the upper portion of each processing cartridge 21 is formed as a toner housing chamber 35 to accommodate toner, wherein a toner for each color is contained. That is, in the toner housing chamber 35, a positively charged non-magnetic single component polymerized toner having a color of: yellow in a yellow processing part 17Y, magenta in a magenta processing part 17M, cyan in a cyan processing part 17C, and black in a black processing part 17K, are housed respectively in each processing part 17.

In each processing part 17, during image-forming a toner of a particular color held in each toner housing chamber 35 is supplied to the supply roller 28 then supplied to the developing roller 27 by rotation of the supply roller 28. The toner is then positively charged by the friction between the supply roller 28 and the developing roller 27 where the developing bias is applied.

While the scorotron charger 26 positively charges the surface of the photoreceptor drum 25 by generating corona discharge using the charged bias that was applied. Following the rotation of the photoreceptor drum 25, after having been positively charged by the scorotron charger 26, the surface of the photoreceptor drum 25 is exposed to high speed scanning by a laser beam from the scanner unit 20, whereby an electrostatic latent image is formed corresponding to the image to be formed on the paper 3.

Furthermore, while the photoreceptor drum 25 rotates, the positively charged toner applied to the surface of the developing roller 27 comes into contact with the opposing photoreceptor drum 25 due to the rotation of the developing roller 27, thereby supplying toner to the electrostatic latent image formed on the surface of the photoreceptor drum 25. That is, on the surface of the photoreceptor drum 25, the exposed portion with low electric potential due to exposure to the laser beam is positively charged completely. As a result, the electrostatic latent image on the photoreceptor drum 25 becomes a visible image and the toners of each particular color form an image on the surface of the photoreceptor drum 25 by means of reverse development.

The transfer part 18 is disposed along the front/rear direction above the paper-feeding part 4 and below the processing part 17 in the main casing 2, and includes a drive roller 36, a driven roller 37, a transport belt 38, a transfer roller 39, and a belt-cleaning device 40.

Figure 2:
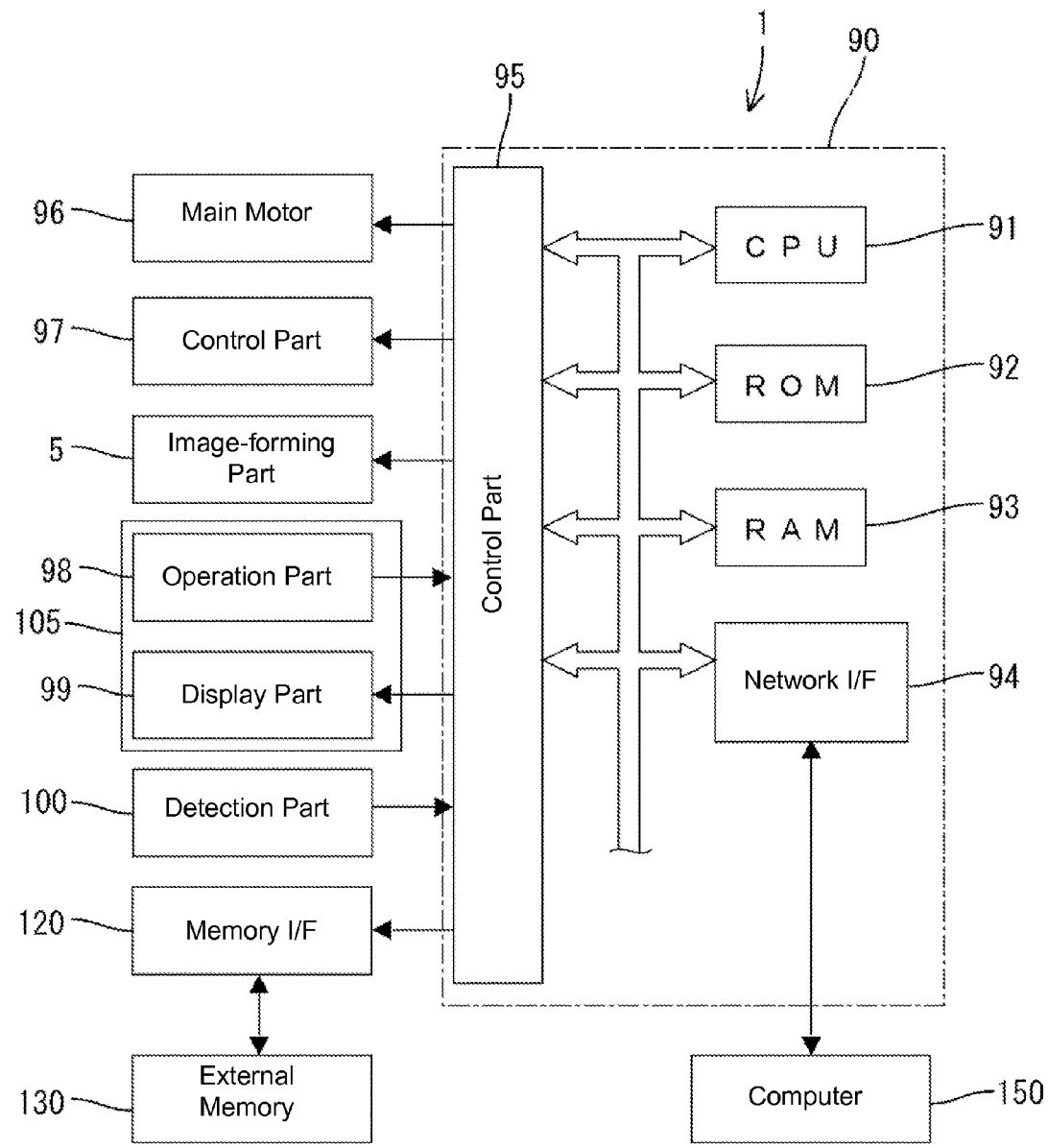
FIG. 2 is a block diagram illustrating the components of the color laser printer in FIG. 1.

The drive roller 36 is disposed at a low height so as not to horizontally overlap with the photoreceptor drum 25 at the rear of the photoreceptor drum 25 of the processing cartridge 21, and is mounted onto the black processing part 17K. By means of a main motor 96, which is not illustrated, (ref. FIG. 2, omitted from FIG. 1) the drive roller 36 is driven to rotate in the direction opposite the direction rotation of the photoreceptor drum 25 (counter-clockwise direction in the figure) while forming the image.

The driven roller 37 is disposed in front of the drive roller 36, in front of the photoreceptor drum 25 of the processing cartridge 21, and is mounted onto the yellow processing part 17Y. When the drive roller 36 is driven to rotate, the driven roller 37 also rotates in the same direction (counter-clockwise direction in the figure) as the direction of travel of the transport belt 38 at the point of contact with the transport belt 38, which will be described next.

The transport belt 38 is a circular belt made of a conductive resin such as polycarbonate or polyimide, wherein conductive particles such as carbon are dispersed. The transport belt 38 is wound around the drive roller 36 and the driven roller 37. The driven roller 37 is driven by the drive roller 36, and the transport belt 38 circulates around the drive roller 36 and the driven roller 37 at an image-forming position opposite to and in contact with the photoreceptor drum 25 of each processing part 17 so as to rotate in the same direction as the photoreceptor drum 25.

The transfer roller 39 is disposed on the transport belt 38 between the drive roller 36 and the driven roller 37 and opposite the photoreceptor drum 25 of each processing part 17 sandwiching the transport belt 38 therebetween. The transfer roller 39 includes a roller shaft 41 made of metal and covered with a roller portion 42 made of a resilient material such as a conductive rubber material, etc. Furthermore, both ends of the roller shaft 41 are rotatably supported by a conductive bearing (not shown). The transfer roller 39 is applied with a transfer bias by the conductive bearing.

Furthermore, the belt-cleaning device 40 is below the transport belt 38, and is disposed in a relatively large space (larger than the space close to the drive roller 36 side) formed close to the driven roller 37 side. The belt-cleaning device 40 includes a cleaning box 46 and a cleaning roller 47. A back up roller 110 opposing the cleaning roller 47 is provided within the transport belt 38 is provided.

The fixing part 19 is disposed in the rear of the transfer part 18. The fixing part 19 includes a heat roller 48 and a pressure roller 49. The heat roller 48 is made of a metal-based pipe having a mold-releasing layer formed on its surface. A halogen lamp is internally mounted along the axial direction of the heat roller 48. The surface of the heat roller 48 is heated to a predetermined temperature by the halogen lamp. Moreover, the pressure roller 49 is provided to press against the heat roller 48.

The color image transferred onto the paper 3 is subsequently transported to the fixing part 19 to be thermally set when the paper 3 passes between the heat roller 48 and the pressure roller 49.

The paper ejection part 6 includes a U-shaped path 50 on the paper ejection side, a paper ejection roller 51, and a paper ejection tray 52. The U-shaped path 50 on the paper ejection side is formed as a substantially U-shaped transport route for the paper 3. The upstream end of the U-shaped path 50 abuts the fixing part 19 such that the paper 3 is fed toward the rear, and the downstream end abuts the paper ejection tray 52 such that the paper 3 is fed toward the front.

The paper ejection roller 51 is provided as a pair of rollers at the downstream end of the U-shaped path 50 on the paper ejection side. The paper ejection tray 52 is formed on the upper surface of the main casing 2 as an inclined wall declining from the front toward the rear. The paper transported from the fixing part 19 is fed to the upstream end of the U-shaped path 50 on the paper ejection side toward the rear and then ejected forward by the paper ejection roller 51 onto the paper ejection tray 52 having the transport direction reversed in the U-shaped path 50 on the paper ejection side.

FIG. 2 is a block diagram showing the components of a laser printer 1. The laser printer 1 includes a control device 90 in which each component is controlled by a control part 95, composed of a CPU 91, a ROM 92, a RAM 93, and an ASIC (Application Specific Integrated Circuit—not shown). Furthermore, components of the control system including a main motor 96, a scanner motor 97, a display panel 105, and a detection part 100 composed of various kinds of sensors etc. are provided to make an electrical connection with a control part 95. Furthermore, the display panel 105 including an operation part 98 and a display part 99. The display part 99 is composed of a liquid crystal display part, etc. and the operation part 98 is composed of a touch panel, etc. that may include various types of keys 98a-98k etc., which will be described later in connection with FIGS. 7-9.

The ROM 92 and the RAM 93 are connected to the CPU 91, which controls various components through the control part 95 according to the process procedure, which is stored in the ROM 92 by storing the processed result in the RAM 93. It will be appreciated that the control device 95 executes computer readable instructions, stored in one or more memories (e.g., ROM 92), in the CPU 91 to carry out many of the processes described below.

The main motor 96 is used to rotate the transport belt 38, etc. Furthermore, the scanner motor 97 is used to rotate the polygon mirror 22 in the scanner unit 20. The CPU 91 performs drive control of the main motor 96 or a scanner motor 97 based on the program stored in advance in the ROM 92.

The control part 95 controls the image-forming part 5 according to the instructions from the CPU 91. To be concrete, the exposure for exposing the surface of the photoreceptor drum 25 and the transfer bias when toners are transferred onto the paper 3 are controlled by each part composing the scanner unit 20.

Moreover, the control device 90 is provided with a network interface (network I/F) 94 for connecting to a computer 150.

Furthermore, the detection part 100 is composed of various types of sensors, which are electrically connected to the control part 95.

In addition, a memory I/F 120 is connected to the control part 95. The memory I/F 120 allows an external memory 130 to be inserted into a slot (not shown) in the control device 90 and connected to the laser printer 1. The laser printer 1 can store information in the external memory 130 through the memory I/F 120 and read information from the external memory 130. The external memory 130 is a semiconductor memory, which is also referred to as a "removable memory". The external memory 130 may be configured as a non-volatile memory.

Figure 3:
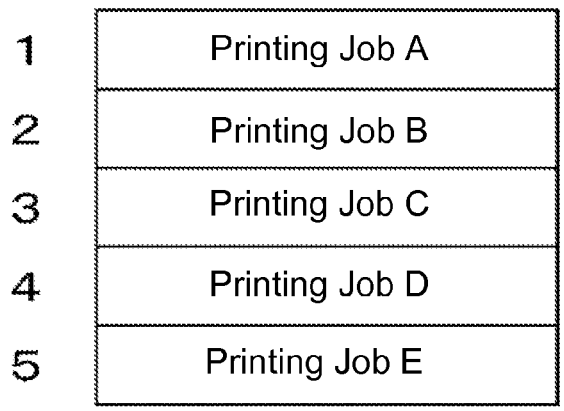
FIG. 3 shows a printing queue according to illustrative aspects of the invention.
Figure 4:
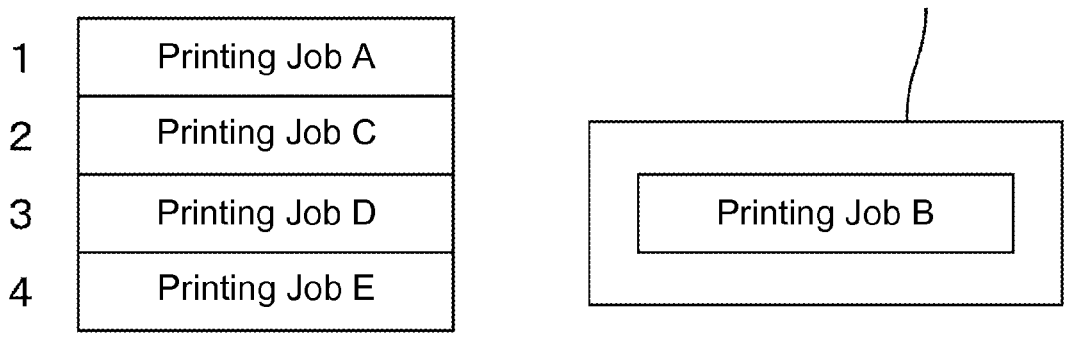
FIG. 4 shows removing a printing job from the printing queue to hold the printing job according to illustrative aspects of the invention.

FIG. 3 shows a printing queue as a data structure of printing jobs. FIG. 4 shows removing a printing job from the printing queue to hold the printing job.

Figure 5:
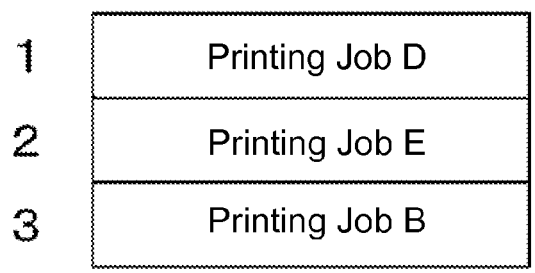
FIG. 5 depicts releasing the held printing job.

FIG. 5 shows the releasing of a held printing job.

In the laser printer 1, a printing job (from hereon referred to as a "job") sent from the computer 150, by a process executed by the CPU 91 (FIG. 2), is received and stored in the RAM 93. Printing jobs stored in the RAM 93 are lined up in a printing queue to be successively printed by the image-forming part 5 described above. The printing queue is a data structure that defines the printing order of jobs to be printed. As shown in FIG. 3, the printing order of jobs is defined so as to be processed in a so called "queue structure".

Furthermore, as shown in FIG. 4, among the printing jobs lined up in the printing queue, at least one of the printing jobs (printing job B in FIG. 4) may be removed from the printing queue to hold (delay) the printing. As shown in FIG. 5, the printing job (printing job B in FIG. 5) removed from the printing queue and put on hold may be later added to the printing queue again. Moreover, the CPU 91 shown in FIG. 2 functions as a holding element, a holding release element, and a deleting element.

Figure 6:
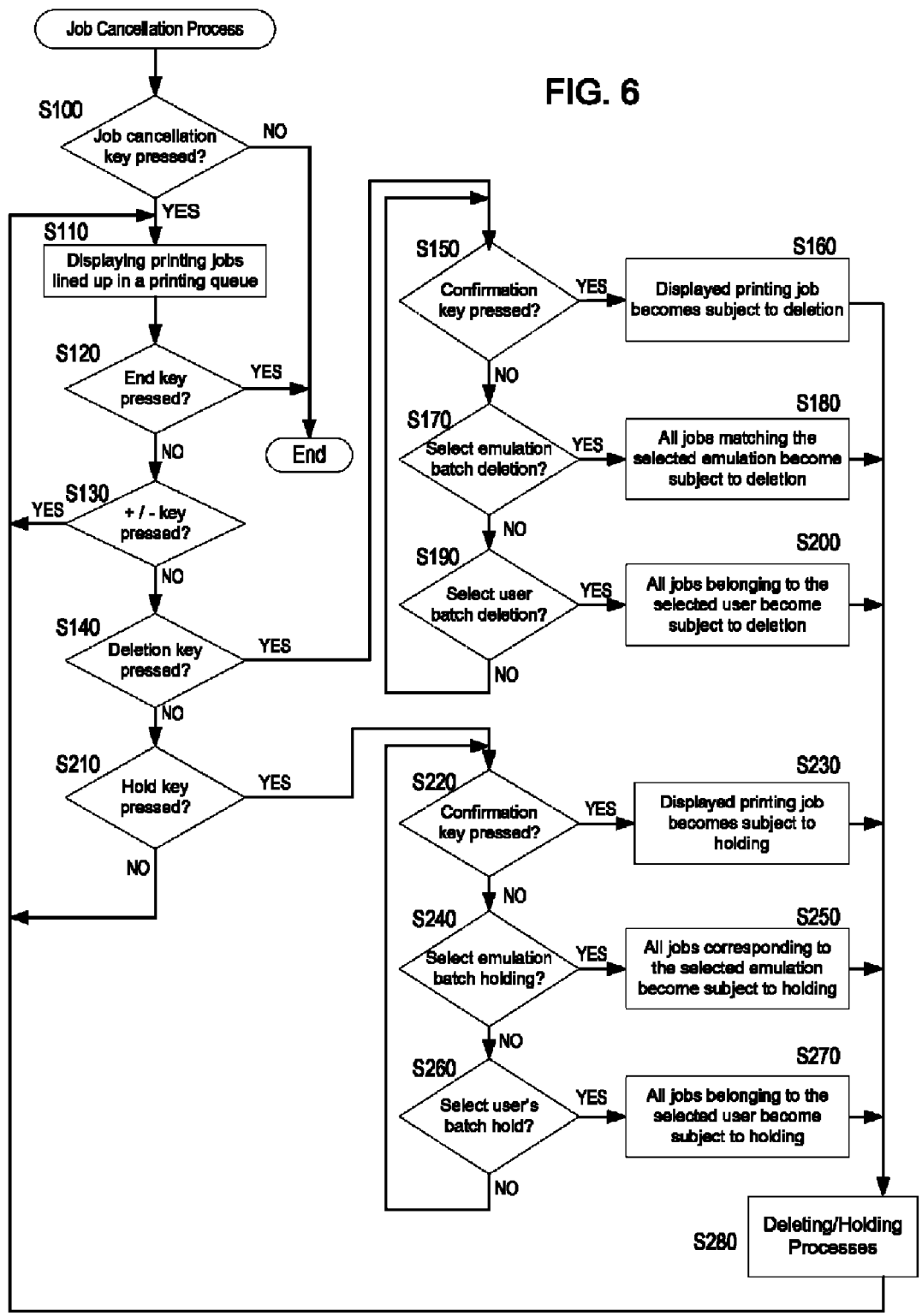
FIG. 6 is an illustrative flow chart of a job cancellation process according to aspects of the invention.
Figure 10:
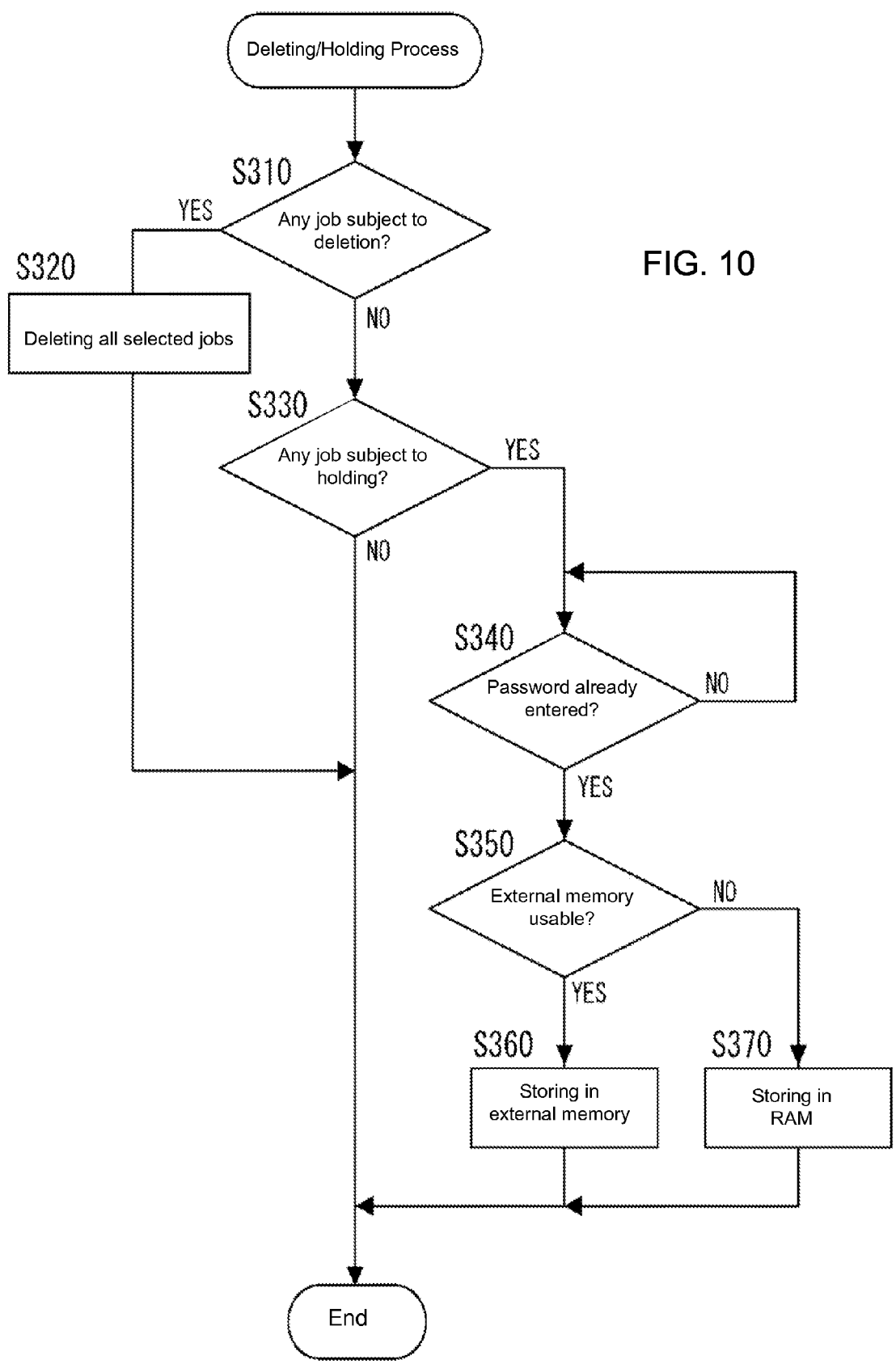
FIG. 10 is an illustrative flow chart showing deleting/holding (delaying) processes according to aspects of the invention.

First, referring to FIG. 6 or FIG. 10, a job cancellation process is described. The job cancellation process is executed in parallel with an image-forming process executed by the image-forming part 5. Each process is executed in the event that a job cancellation key (not shown) is pressed on a display panel 105.

Figure 7:
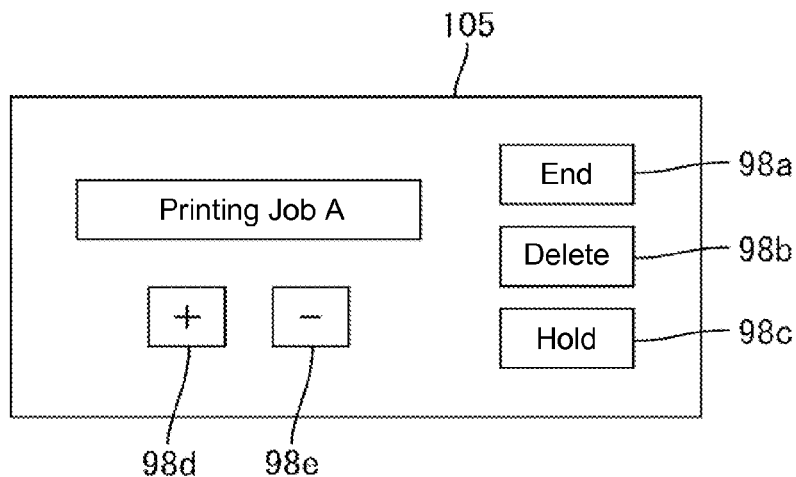
FIG. 7 shows an example of a printing job display according to aspects of the invention.

First, when the job cancellation key is pressed, (YES in step S100), the printing jobs are displayed in order in the printing queue (in step S110). As shown in FIG. 7, the printing jobs may be displayed one by one in order in the printing queue. When the job cancellation key is pressed in step S100, the first printing job in order is displayed in step S110. When an End key 98a is pressed on the display panel 105 (YES in step S120) the process ends; if the End key 98a is not processed (NO in step S120), the process continues at step S130. As shown in FIG. 7, while a printing job is displayed, + key 98d and − key 98e are displayed on the display panel 105. When either the + key 98d or the − key 98e is pressed, the process returns to step S110 again to display the printing job. If the + key 98d is pressed, the next printing job in the printing queue is displayed, and if the − key 98e is pressed, the printing job before the next job in the printing queue is displayed.

Figure 8:
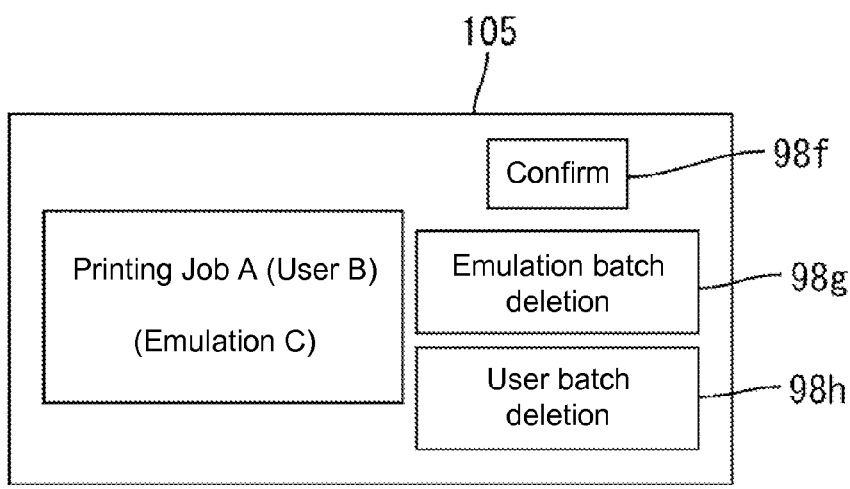
FIG. 8 shows an example of a display defining the printing jobs subject to deletion according to aspects of the invention.

Furthermore, as shown in FIG. 7, in the event that a delete key 98b is pressed instead of + key 98d or − key 98e while any printing job is displayed (YES in step S140), the process proceeds to step S150. If the delete key 98b is pressed, a display like the one shown in FIG. 8 is displayed. Moreover, when a confirmation key 98f is pressed, (YES in step S150), then in step S160 the printing job (printing job A in FIG. 8) displayed is subject to deletion and the contents of the job are stored. Further, in the display of FIG. 8, in the event that an emulation batch deletion key 98g is pressed instead of the confirmation key 98f, (NO in step S150 and YES in step S170), then in step S180 all of the printing jobs corresponding to the selected emulation are subject to deletion and the contents of the jobs are stored. In this illustrative example, all of the printing jobs having the same type of emulation as the displayed printing job become subject to deletion. In the event that an emulation batch deletion is not selected (NO in step S170), and a user batch deletion key 98h is selected (YES in step S190), then all of the printing jobs selected by the user are subject to deletion and the contents of the jobs are stored. In this illustrative example, all of the printing jobs belonging to the user whose printing job is displayed become subject to deletion and have their contents stored.

Furthermore, in certain aspects, the printing jobs emulating those jobs displayed also become subject to batch deletion. However, by enabling entry of emulation information (the emulation name, or code, etc.), printing jobs corresponding to the entered emulation information may be subjected to batch deletion. Moreover, in some aspects, all of the printing jobs belonging to the user whose printing job is displayed become subject to deletion. However, by enabling entry of user information (user name or user code, etc.), all of the printing jobs belonging to the user may be subjected to batch deletion.

Figure 9:
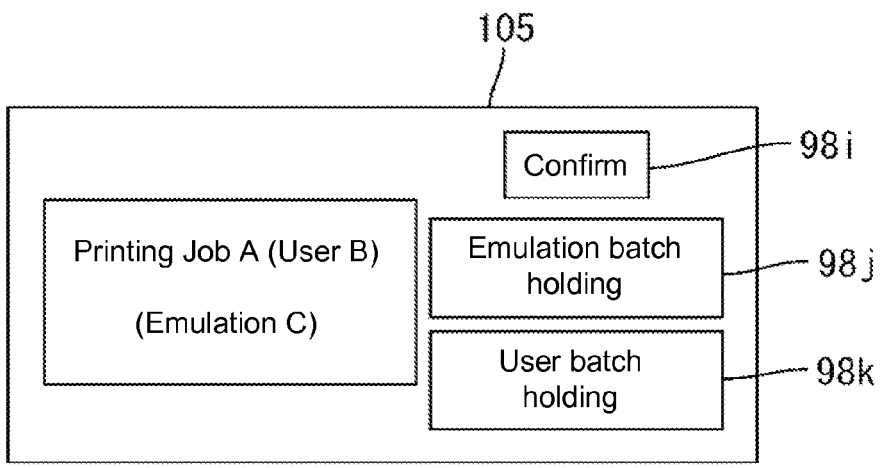
FIG. 9 shows an example of a display defining the printing jobs subject to being held according to aspects of the invention.

Instead of the deletion key 98b (NO in step S140), a hold key 98c may be pressed in the display (YES in step S210) shown in FIG. 7 resulting in the display shown in FIG. 9. In the event that the confirmation key 98i is pressed (YES in step S220), then in step S230 the printing job displayed (printing job A in FIG. 9) is subject to holding and the contents of the job are stored. Furthermore, on the display in FIG. 9, if the confirmation key 98i is not pressed (NO in step S220) and an emulation batch hold key 98j is selected in step S240, then in step S250 all of the printing jobs corresponding to the selected emulation are subjected to being held and the contents of those jobs are stored. In some aspects, all of the printing jobs with the same type of emulation as the printing job displayed (printing job A in FIG. 9) are subjected to being held. Moreover, in the display of FIG. 9, in the event that an emulation batch holding key 98j is not selected (NO in step S240), a user batch hold key 98k may be selected (YES in step S260). In this case, in step S270 all of the selected printing jobs belonging to the user would be subjected to holding and the contents of those jobs would be stored. In this example, all of the printing jobs belonging to the user of the displayed printing job become subjected to being held.

Furthermore, the printing jobs with the same type of emulation as the displayed printing job were collectively subjected to being held. However, by enabling entry of emulation information (e.g., emulation name, or code, etc.), printing jobs corresponding to the entered emulation may collectively be subjected to being held. Moreover, in these aspects, all of the printing jobs belonging to a user whose printing job is displayed become subjected to being held. However, by enabling entry of user information (user name or user code, etc.), all of the printing jobs belonging to the user may be subjected to being held.

As described, after defining the printing jobs to be deleted or to be held in one of steps S160, S180, S200, S230, S250 and S270, the deleting/holding process of step S280 can be executed. As shown in FIG. 10, in the deleting/holding processes, in step S310 it is determined whether a job subject to deletion exists. If a job subject to deletion has been selected (process entered from one of steps S160, S180 or S200), all of the selected printing jobs are deleted (erased) in step S320.

Whereas, in the event that a printing job subject to deletion does not exist, but a printing job subject to holding exists (NO in step S310 followed by YES in step 330), a user is prompted to enter a password, which, if entered, is stored in RAM 93. When password entry is complete (YES in step S340), in step S350 the process determines whether the external memory 130 (FIG. 2) is usable to store the printing. If the external memory 130 is usable (YES in step S350), the printing job subject to being held is stored in the external memory 130. On the other hand, if the external memory 130 is not usable (NO in step S350), such as in the event that the external memory 130 has not been inserted properly or if the storage capacity of the external memory 130 is insufficient, then the printing job subjected to being held is stored in the RAM 93 in step S370. After all the selected jobs have been deleted in step S320 or if no jobs are subjected to being deleted in steps 5310 and steps 320, the deleting/holding process is terminated.

Figure 11:
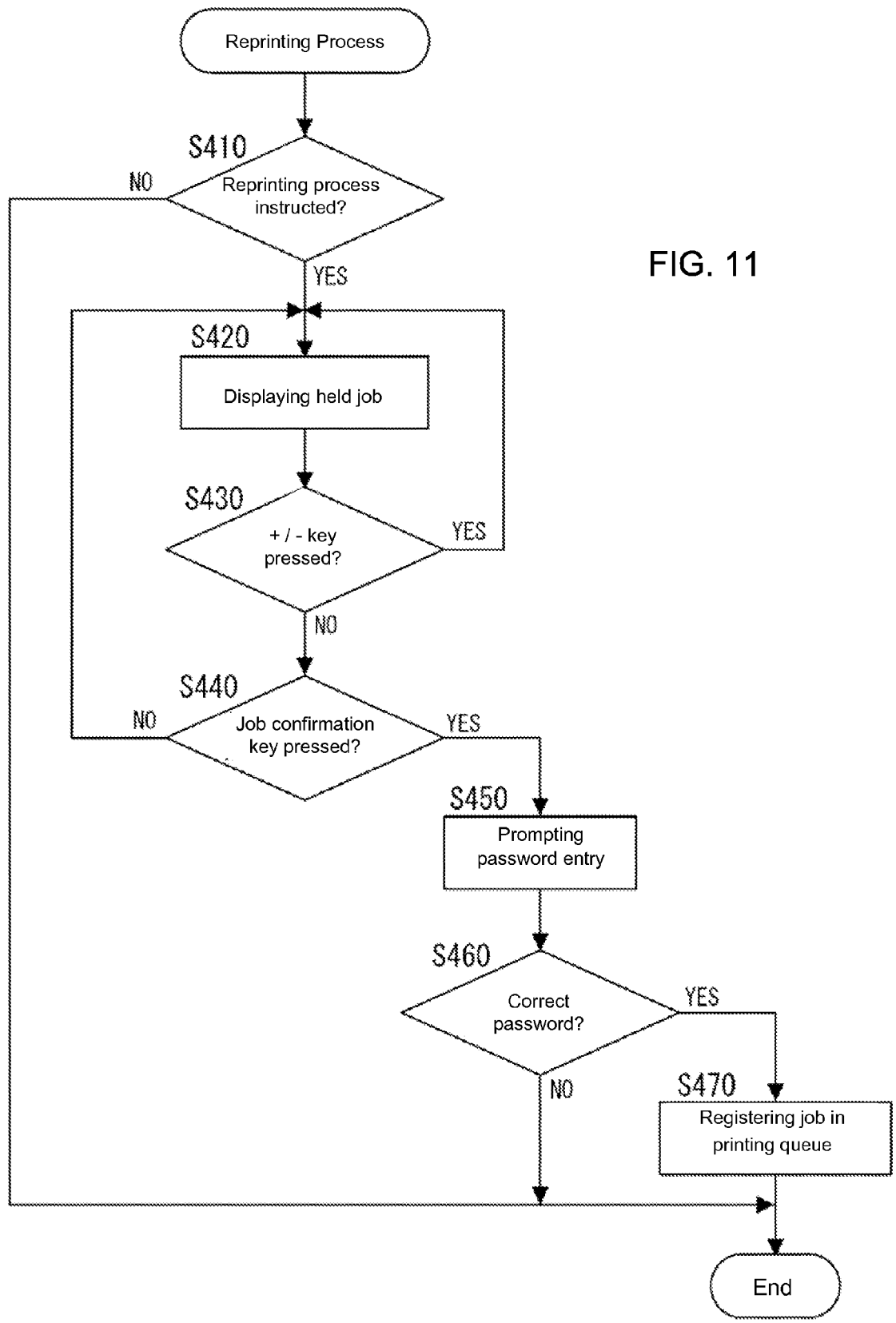
FIG. 11 is an illustrative flow chart showing a reprinting process according to aspects of the invention.

FIG. 11 is an illustrative flow chart showing a reprinting process according to aspects of the invention. Once reprinting process starts in the operation part 98 of the display panel 105, the system is ready to receive information requesting reprinting. The process determines whether reprinting was requested in step S410. In the event that reprinting was not requested (NO in step S410), the process ends. In the event that reprinting was requested (YES in step S410), in step S420 the process displays the printing jobs stored and held in step S360 or step S370 in the deleting/holding process of FIG. 10. This display screen can be configured in approximately the same way as that previously described in FIG. 7. Namely, a part for displaying a printing job on hold, a + key, a – key, and a confirmation key are displayed. If the + key or the – key is pressed (YES in step S430), the process in step S420 displays the printing jobs subject to in accordance with the defined key operation (described above). While any printing job is displayed, if neither the + key nor the – key is pressed, but the job confirmation key is pressed, (NO in step S430 and YES in step S440), entry of the password is prompted in step S450. If the entered password is correct in that it corresponds to the password registered in step S340 of FIG. 10 (YES in step S460), the corresponding printing job will be reregistered in the printing queue in step S470. If the password is incorrect or not entered within a designated period of time (NO in step S460) the process is terminated.

Furthermore, as for the printing jobs to be reregistered in the printing queue in step S470, if a portion of the job has already printed, the unprinted portion of the printing jobs may optionally be added. In this way, duplication of printing may be avoided minimized, and efficient printing may be performed. In this case, in step S360 or step S370 of FIG. 10, the unprinted portion of the printing jobs may be stored, and in step S470, the unprinted portion of the printing jobs may be registered in the printing queue. In another aspect, in the event that a portion of the job has been already printed, both the printed portion and unprinted portion, the entire printing job, may be registered in the printing queue.

Moreover, the printing jobs stored and held in step S360 or step S370 of FIG. 10 may also be deleted. In this way, printing jobs that were once on hold can be deleted at a later time in the event that printing of the jobs held in the RAM 93 is no longer required.

In aspects described, printing jobs that were once added to the printing queue may be held without being deleted (erased), and the printing jobs may be removed temporarily from the printing queue, and later, in the event that a situation arises requiring the job to be printed, the printing process may be performed quickly.

Moreover, printing jobs may be held collectively.

Furthermore, in steps S220, S240, and S260 in FIG. 6, since conditions may be entered to determine which printing jobs are subjected to being held, printing jobs satisfying the conditions may be put on hold. Therefore, printing jobs corresponding to the conditions may be held collectively, thus providing further convenience.

Furthermore, since password entry by a user is possible, if the entered password is correct, printing jobs on hold may be added to the printing queue again.

Therefore, the printing jobs on hold are effectively prevented from being output by an unauthorized third party.

Furthermore, since printing jobs on hold are stored in the external memory 130 (FIG. 2) attachably/detachably mounted to the laser printer 1, the external memory 130 in which the printing jobs on hold are stored may be removed, thus preventing the printing jobs from being printed by an unauthorized third party.

Aspects of the invention are not limited to those explained according to the above description and figures and various modifications are possible without departing from the scope of the invention. For example, it will be appreciated that image forming devices other than a color laser printer may be employed including, but not limited to, multi-function devices, black and white printers, copiers, scanners, facsimile machines and the like.

What is claimed is:

1. An image-forming device comprising:
    a printing element configured to successively print a plurality of printing jobs in a printing queue,
    a holding element configured to remove a printing job from the printing queue and hold the printing job in response to first user input, the holding element configured to determine if any other printing jobs sharing a characteristic in common with the printing job are subject to being held based on second user input received subsequent to the first user input and removing and holding any other printing jobs, which share a characteristic in common with the printing job and are subject to being held, from the printing queue based on the second user input; and
    a release element configured to return the printing job on hold to the printing queue.

2. The image-forming device according to claim 1, further including a deleting element configured to delete the printing jobs in the printing queue in response to third user input.

3. The image-forming device according to claim 2, wherein the deleting element is configured to delete the printing jobs that are being held in response to fourth user input.

4. The image-forming device according to claim 1, comprising an input interface configured to receive entry of a password, wherein if the password entered matches a stored password, the release element returns the printing jobs on hold to the printing queue.

5. The image-forming device according to claim 1, wherein the holding element stores the held printing jobs in a removable memory.

6. The image-forming device according to claim 1, wherein, when a portion of the printing jobs held by the holding element have been printed and the printing jobs are returned to the printing queue by the release element, only an unprinted portion of the printing jobs is configured to be printed by printing element.

7. The image-forming device according to claim 1, wherein the printing jobs are received by the image forming device from a computer connected to the image-forming device.

8. A computer implemented method for execution in an image forming device comprising:
    successively printing a plurality of printing jobs in a printing queue,
    receiving first user input requesting that a printing job in the printing queue be held;
    determining if any other printing jobs share a characteristic in common with the printing job are subject to being held based on second user input received subsequent to the first user input;
    removing and holding the printing job and any other printing jobs, which share a characteristic in common with the printing job and are determined to be subject to being held, from the printing queue based on the second user input, and
    returning the printing job on hold to the printing queue.

9. The method according to claim 8, further comprising:
    deleting the at least one printing job returned to the printing queue in response to third user input.

10. The method according to claim 8, further comprising:
    receiving entry of a password when the at least one printing job is being held, and
    determining if the password entered matches a stored password, wherein the returning the at least one printing job on hold to the printing queue occurs in response to determining that a match exists.

11. The method according to claim 8, further comprising:
    storing the printing job being held in a removable memory.

12. The method according to claim 8, wherein, when a portion of the at least one printing job held has been printed and the at least one printing job is returned to the printing queue, only an unprinted portion of the at least one printing job is printed.

13. The method according to claim 8, further comprising receiving the at least one printing job from a computer connected to the image-forming device.

14. One or more computer readable media having computer-executable instructions stored thereon that when executed perform the method of:
    successively printing a plurality of printing jobs in a printing queue,
    receiving first user input requesting that a printing job in the printing queue be held;
    determining if any other printing jobs share a characteristic in common with the printing job are subject to being held based on second user input received subsequent to the first user input;
    removing and holding the printing job and any other printing jobs, which share a characteristic in common with the printing job and are determined to be subject to being held, from the printing queue based on the second user input, and
    returning the printing job on hold to the printing queue.

* * * * *